US006205797B1

(12) United States Patent
Maeda

(10) Patent No.: US 6,205,797 B1
(45) Date of Patent: Mar. 27, 2001

(54) AIR-CONDITIONING SYSTEM AND METHOD OF OPERATING THE SAME

(75) Inventor: Kensaku Maeda, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/402,656

(22) PCT Filed: Apr. 10, 1998

(86) PCT No.: PCT/JP98/01661

§ 371 Date: Oct. 8, 1999

§ 102(e) Date: Oct. 8, 1999

(87) PCT Pub. No.: WO98/46959

PCT Pub. Date: Oct. 22, 1998

(30) Foreign Application Priority Data

Apr. 11, 1997 (JP) ................................. 9-110145

(51) Int. Cl.⁷ ......................... F25D 23/00; F25D 17/06
(52) U.S. Cl. ................................ 62/94; 62/271; 62/175
(58) Field of Search ........................... 62/94, 271, 176.1, 62/175

(56) References Cited

U.S. PATENT DOCUMENTS

| 4,887,438 | 12/1989 | Meckler ................................. 62/271 |
| 5,325,676 | 7/1994 | Meckler ................................. 62/93 |
| 5,353,606 | * 10/1994 | Yoho et al. ........................... 62/271 |
| 5,364,455 | 11/1994 | Komarneni et al. ................... 95/117 |
| 5,448,895 | 9/1995 | Coellner et al. ....................... 62/94 |
| 5,517,828 | * 5/1996 | Calton et al. ......................... 62/271 |
| 5,718,122 | 2/1998 | Maeda .................................. 62/185 |
| 5,758,509 | 6/1998 | Maeda .................................... 62/94 |
| 5,761,923 | 6/1998 | Maeda .................................. 62/271 |
| 5,761,925 | 6/1998 | Maeda .................................. 62/476 |
| 5,791,157 | 8/1998 | Maeda .................................. 62/483 |
| 5,816,065 | 10/1998 | Maeda .................................. 62/271 |
| 5,931,015 | 8/1999 | Maeda .................................. 62/271 |
| 5,943,874 | 8/1999 | Maeda .................................. 62/271 |
| 5,950,442 | 9/1999 | Maeda .................................. 62/175 |
| 5,950,447 | 9/1999 | Maeda et al. ......................... 62/271 |

FOREIGN PATENT DOCUMENTS

| 61-138038 | 6/1986 | (JP) . |
| 6-101930 | 4/1994 | (JP) . |
| 8-14600 | 1/1996 | (JP) . |

* cited by examiner

*Primary Examiner*—William Wayner
(74) *Attorney, Agent, or Firm*—Armstrong, Westerman, Hattori, McLeland & Naughton

(57) ABSTRACT

This invention provides an air conditioning system and operation method, having superior dehumidification ability and flexibly adaptable for processing a variety of conditioning loads, and also energy conserving. The invention comprises: a desiccant 103 for adsorbing moisture from process air; and a heat pump 200, including a compressor 260, that operates by using process air as a low-temperature heat source 240 and regeneration air as a high-temperature heat source 220 so as to supply heat to regeneration air for regenerating the desiccant. Processes of heat transfer in a sensible heat exchanger are made adjustable, for exchanging heat between post-desiccant process air that has not flowed into the low temperature heat source heat exchanger and pre-desiccant regeneration air that has not yet regenerated the desiccant.

15 Claims, 12 Drawing Sheets

F/G. 1

AIR-CONDITIONING SYSTEM AND METHOD OF OPERATING THE SAME

TECHNICAL FIELD

This invention relates to air conditioning systems, and relates in particular to an air conditioning system that can operate continually air dehumidifying process by a desiccant and regeneration of the desiccant by heat pump.

BACKGROUND ART

FIG. 10 shows a system based on the conventional technology disclosed in a U.S. Pat. No. 4,430,864, which is comprised by: process air passage A; regeneration air passage B; two desiccant beds 103A, 103B; a heat pump 200 for regeneration of desiccant and cooling of process air. The heat pump 200 uses heat exchangers 220, 210 embedded in the desiccant beds 103A, 103B as high and low temperature heat sources respectively, in which one desiccant bed performs dehumidifying by passing process air, and the other desiccant bed performs regeneration of desiccant beds by passing regeneration air. After air conditioning is carried out for a specific time interval, four-way switching valves 105, 106 are operated to perform reverse processes in respective desiccant beds by flowing regeneration air and process air in the opposite desiccant beds.

In the conventional technology described above, high/low heat source of the heat pump 200 and each desiccant are integrated in each unit, and, an amount of heat equivalent to the cooling effect $\Delta Q$, is totally loaded on the heat pump (vapor compression cycle). That is, cooling effect cannot exceed the capability of the heat pump (vapor compression cycle) used. Therefore, there is no benefit resulting from making the system complex.

Therefore, to resolve such problems, it is possible to consider a system, such as the one shown in FIG. 11, to heat the regeneration air by placing a high temperature source 220 in the regeneration air passage B, and placing a low temperature air source 240 in the process air passage A to cool the process air, as well as to provide a heat exchanger 104 for exchanging sensible heat between the post-desiccant process air and pre-desiccant regeneration air. In this case, the desiccant 103 uses a desiccant wheel which rotates so as to straddle the process air passage A and the regeneration air passage B.

This system can provide cooling effects ($\Delta Q$), which is a sum of the cooling effects produced by the heat pump and the cooling effects produced by sensible heat exchange performed between process air and regeneration air, as shown in the psychrometric chart presented in FIG. 12, thus producing a system of more compact design and capable of generating a higher cooling effects than that produced by the system shown in FIG. 10.

However, even in this type of air conditioning system, when processing a relatively low sensible heat load, as may happen during the rainy season, producing a relatively low temperature and a high humidity, it is difficult to obtain a heat balance between the heat produced by the heat pump needed for desiccant regeneration and the cooling load for sensible heat processing, resulting that, if priority is given to obtain dehumidification, the temperature of the conditioning space may become too low because cooling of supply air in the low-temperature heat source heat exchanger 240 can cause excessive cooling.

This invention has been made to solve the problems outlined above by providing an air conditioning system that can produce continual dehumidification of supply air and desiccant regeneration, by developing a system that enables to adjust the heat transfer process in the sensible heat exchanger disposed between the post-desiccant process air that has not yet flowed into the low-temperature heat source heat exchanger and regeneration air that has not yet flowed into the high-temperature heat source heat exchanger. When air conditioning is aimed primarily at dehumidification of process air with a low sensible heat fraction, heat transfer processes in the sensible heat exchanger are controlled so as to retain the sensible heat load in the low-temperature heat source heat exchanger, thereby increasing the temperature of supply air into the conditioning space. Such a system, when operated according to the method presented, conserves energy while exhibiting superior dehumidifying capability and flexibility in processing a variety of cooling loads.

DISCLOSURE OF INVENTION

This invention has been made to achieve the objectives stated above, and the invention according to claim 1 is an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein processes of heat transfer in a sensible heat exchanger are made adjustable, for exchanging heat between post-desiccant process air that has not flowed into the low temperature heat source heat exchanger and pre-desiccant regeneration air that has not yet regenerated the desiccant.

Accordingly, by adjusting the heat transfer rate in the sensible heat exchanger, the system is able to adapt itself flexibly to dehumidify or cool the conditioning load with various sensible heat fraction so that dehumidifying mode of operation does not lead to excessive cooling.

The invention according to claim 2 is an air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating the desiccant; wherein post-desiccant process air that has passed through the desiccant exchanges heat in a first sensible heat exchanger with regeneration air that has not yet flowed into a high-temperature heat source heat exchanger of the heat pump; and regeneration air that passed through the first sensible heat exchanger but has not yet entered the high temperature heat source heat exchanger exchanges heat in a second sensible heat exchanger with post-desiccant regeneration air; and heat transfer processes in the first sensible heat exchanger are made adjustable.

Accordingly, by adjusting the heat transfer in the sensible heat exchanger, the system is able to adapt flexibly to a variety of cooling requirements dictated by the sensible heat fraction in the conditioning load, and when operating in the dehumidifying mode, cooling of process air in the first sensible heat exchanger is suppressed before it enters into the low-temperature heat source heat exchanger so that the process air can serves as the source of low-temperature heat for desiccant regeneration, thereby securing sensible heat load for the low-temperature heat source heat exchanger, and avoiding excessive cooling in the room to be air conditioned. If the sensible heat load is high, the first sensible heat exchanger can be operated to lower the temperature of process air at the outlet of the heat pump, therefore, the system can be used in the cooling mode also.

The invention according to claim 3 is an air conditioning system according to claim 2, wherein at least the first sensible heat exchanger is a rotary heat exchanger, whose heat exchange processes are made adjustable by varying a rotational speed. Accordingly, by adjusting the speed of rotation of rotary heat exchanger that is easy to control its heat transfer process, the system can be used for either dehumidification or cooling.

The invention according to claim 4 is an air conditioning system comprising: a desiccant for adsorbing moisture in process air; and a heat pump, including a compressor, that operates by using process air as a low-temperature heat source and regeneration air as a high-temperature heat source so as to supply heat to regeneration air for desiccant regeneration; wherein paths of process air and regeneration air that pass through the desiccant are divided into a first zone for dehumidifying process air and a second zone for regenerating the desiccant using regeneration air so that the desiccant repeatedly shifts its position between the first zone and the second zone, and the heat pump is comprised by at least a compressor, a low-temperature heat source heat exchanger and a high-temperature heat source heat exchanger, and the path of process air is routed sequentially from an inlet for the process air, through the desiccant in the first zone, a first sensible heat exchanger, and the low-temperature heat source heat exchanger to arrive at an outlet for process air, and the path of regeneration air is routed sequentially from an inlet for the regeneration air, through the first sensible heat exchanger, a second sensible heat exchanger, the high temperature heat source heat exchanger, the desiccant in the second zone, and the second sensible heat exchanger to arrive at an outlet for regeneration air, and process air exchanges heat with regeneration air in the first sensible heat exchanger, regeneration air exchanges heat with regeneration air in the second sensible heat exchanger, and heat transfer processes in the first sensible heat exchanger are made adjustable.

Accordingly, the system is configured so that moisture adsorption process and regeneration process in the desiccant can be operated continually, and post-desiccant process air exchanges heat in the first sensible heat exchanger with regeneration air that has not flowed into the high temperature heat source heat exchanger, and the heat transfer processes are made adjustable, so that, when operating in the dehumidifying mode, cooling of process air in the first sensible heat exchanger is suppressed before it enters into the low-temperature heat source heat exchanger so that the process air can serves as the source of low-temperature heat for desiccant regeneration, thereby securing sensible heat load for the low-temperature heat source heat exchanger, and avoiding excessive cooling in the room to be air conditioned. If the sensible heat load is high, the first sensible heat exchanger can be operated to lower the temperature of process air at the outlet of the heat pump, thereby saving heating of regeneration air to provide an energy conserving air conditioning system that is able to process a variety of cooling loads.

The invention according to claim 5 is an air conditioning system according to claim 4, wherein the desiccant is shaped in a wheel, and the desiccant repeatedly shifts its position between the first zone and the second zone through its rotation.

Accordingly, by shaping the desiccant as a rotor to enable it to rotate, process air dehumidifying by the desiccant and desiccant regeneration by the heat pump can be performed continually.

The invention according to claim 6 is an air conditioning system according to claim 4 or 5, wherein at least the first sensible heat exchanger is a rotary heat exchanger so that heat transfer processes are made adjustable by varying a rotational speed of the first sensible heat exchanger.

Accordingly, by adjusting the speed of rotation of rotary heat exchanger that is easy to adjust its heat transfer process, the system can be used for either dehumidification or cooling depending on the sensible heat fraction of the conditioning load.

The invention according to claim 7 is a method for operating an air conditioning system according to claim 6, wherein measurements of dry bulb temperature and humidity in a conditioning space are obtained so that, when a dry bulb temperature measurement is lower than a temperature setting and a humidity measurement is higher than a humidity setting, a rotational speed of the first sensible heat exchanger is adjusted so that when an absolute value of a difference between the dry bulb temperature measurement and the temperature setting is high, the rotational speed is decreased, and when an absolute value of a difference between the dry bulb temperature measurement and the temperature setting is low, the rotational speed is increased.

Accordingly, when a dry bulb temperature measurement is lower than a temperature setting and a humidity measurement is higher than a humidity setting, that is, when it is necessary to operate in the dehumidifying mode, depending on the load condition, when the sensible heat load is high, heat transfer from process air to regeneration air is increased, and when the sensible heat load is low, heat transfer from process air to regeneration air is decreased, thereby enabling to control sensible heat processing and dehumidification separately and to maintain amenity in the air conditioning space even in a dehumidifying operational mode.

The invention according to claim 8 is an air conditioning system comprising: a desiccant for adsorbing moisture in process air; and a heat pump, including a compressor, that operates by using process air as a low-temperature heat source and regeneration air as a high-temperature heat source so as to supply heat to regeneration air for desiccant regeneration; wherein paths of process air and regeneration air that pass through the desiccant are divided into a first zone for dehumidifying process air and a second zone for regenerating the desiccant using regeneration air so that the desiccant repeatedly shifts its position between the first zone and the second zone, and the heat pump is comprised by at least a compressor, a low-temperature heat source heat exchanger and a high-temperature heat source heat exchanger, and the path of process air is routed sequentially from an inlet for process air, through the desiccant in the first zone, a first sensible heat exchanger, the low temperature heat source heat exchanger, and a humidifier to arrive at an outlet for process air, and the path of regeneration air is routed sequentially from an inlet for regeneration air, the first sensible heat exchanger, the second sensible heat exchanger, the high temperature heat source heat exchanger, the desiccant in the second zone, and the second sensible heat exchanger to arrive at outlet for regeneration air, and process air exchanges heat with regeneration air in the first sensible heat exchanger, regeneration air exchanges heat with regeneration air in the second sensible heat exchanger, and heat transfer processes in the first sensible heat exchanger are made adjustable.

Accordingly, the system is configured so that moisture adsorption process and regeneration process in the desiccant can be operated continually, and post-desiccant process air exchanges heat in the first sensible heat exchanger with regeneration air that has not flowed into the high temperature heat source heat exchanger, and the heat transfer processes are made adjustable, so that, when operating in the dehumidifying mode, cooling of process air in the first sensible heat exchanger is suppressed before it enters into the low-temperature heat source heat exchanger so that the process air can serves as the source of low-temperature heat for desiccant regeneration, thereby securing sensible heat load for the low-temperature heat source heat exchanger, and avoiding excessive cooling in the room to be air conditioned. If the sensible heat load is high, the first sensible heat exchanger can be operated to lower the temperature of process air at the outlet of the heat pump, thereby saving heating of regeneration air to provide an energy conserving air conditioning system that is able to process a variety of cooling loads.

The invention according to claim 9 is an air conditioning system according to claim 8, wherein the desiccant is shaped in a wheel, and the desiccant repeatedly shifts its position between the first zone and the second zone through its rotation.

Accordingly, by shaping the desiccant as a rotor to enable it to rotate, process air dehumidifying by the desiccant and desiccant regeneration by the heat pump can be performed continually.

The invention according to claim 10 is an air conditioning system according to claim 8 or 9, wherein at least the first sensible heat exchanger is a rotary heat exchanger so that heat transfer processes are made adjustable by varying a rotational speed of the first sensible heat exchanger. Accordingly, by adjusting the speed of rotation of rotary heat exchanger that is easy to adjust its heat transfer process, the system can be used for either dehumidification or cooling depending on the sensible heat fraction of the conditioning load.

The invention according to claim 11 is an air conditioning system according to one of claims 8 to 10, wherein a bypass passage is provided so as to bypass process air from a downstream location of the low-temperature heat source heat exchanger to an upstream location of the desiccant. Accordingly, by recirculating process air that has been dehumidified in the desiccant, dehumidification load on the desiccant is decreased, and the system is able to process air when the conditioning load is low, and if it is necessary to perform only regeneration process for the desiccant at the startup, regeneration time is decreased.

The invention according to claim 12 is a method for operating an air conditioning system disclosed in one of claims 8 to 11, comprising the steps of: detecting dry bulb temperature and humidity in a conditioning space to select an operational mode from four operational modes; wherein a first operational mode is chosen, when a dry bulb temperature measurement is higher than a temperature setting and a humidity measurement is higher than a humidity setting, by operating the first sensible heat exchanger at a maximum capacity, stopping the humidifier, and operating the compressor so as to increase a capacity as an absolute value of a difference between the dry bulb temperature measurement and the temperature setting measurement increases; and a second operational mode is chosen, when a dry bulb temperature measurement is higher than a temperature setting and a humidity measurement is lower than a humidity setting, by operating the first sensible heat exchanger at a maximum capacity, operating the humidifier, and operating the compressor so as to increase a capacity as an absolute value of a difference between the dry bulb temperature measurement and the temperature setting measurement increases; and a third operational mode is chosen, when a dry bulb temperature measurement is lower than a temperature setting and a humidity measurement is lower than a humidity setting, by operating the first sensible heat exchanger at a maximum capacity, stopping the humidifier, and operating the compressor so as to decrease a capacity as an absolute value of a difference between the dry bulb temperature measurement and the temperature setting measurement increases; and a fourth operational mode is chosen, when a dry bulb temperature measurement is lower than a temperature setting and a humidity measurement is higher than a humidity setting, operating the first sensible heat exchanger so as to decrease a heat exchange capacity as an absolute value of a difference between the dry bulb temperature measurement and the temperature setting measurement increases, stopping the humidifier, and operating the compressor so as to increase a capacity as an absolute value of a difference between the dry bulb temperature measurement and the temperature setting measurement increases. Accordingly, by adjusting the compressor, the first sensible heat exchanger and humidifier individually, the system can be used in the dehumidifying mode or cooling mode according to the sensible heat fraction in the conditioning load.

The invention according to claim 13 is a method according to claim 12, wherein a flow rate of regeneration air is decreased as a capacity of the compressor is decreased. Accordingly, by adjusting the flow rate of regeneration air according to the compressor capability, it is possible to keep the desiccant regeneration temperature of the regeneration air at a constant value so that the desiccant can always maintain dehumidification ability, and the system is able to process a variety of conditioning loads.

The invention according to claim 14 is a method according one of claim 12 or 13, wherein, when the compressor is operated at a reduced capacity, a bypass flow rate of process air is increased by branching process air from a downstream location of the low-temperature heat source heat exchanger and routing to an upstream location of the desiccant. Accordingly, when the cooling conditioning load is low and the compressor capability is restricted, by recirculating the regeneration air that has passed through the desiccant, dehumidifying capability against the external loads can be decreased depending on the cooling conditioning loads while maintaining a high level of the desiccant performance.

The invention according to claim 15 is a method according to claim 11, wherein the desiccant is regenerated by operating the first sensible heat exchanger at a maximum capacity, and branching process air from a downstream location of the low-temperature heat source heat exchanger and routing to an upstream location of the desiccant.

Accordingly, when the desiccant is loaded as a result of prolonged shut-down of the system, process air can be bypassed so as to suppress moisture adsorption on the desiccant, and heat of the low-temperature heat source necessary for desiccant regeneration is transferred from regeneration air to process air in the first sensible heat exchanger, thereby enabling to heat regeneration air continually using the heat from the high temperature heat source of the heat pump and improving the startup characteristics of the system.

BEST MODE FOR CARRYING OUT THE INVENTION

Figure 1:
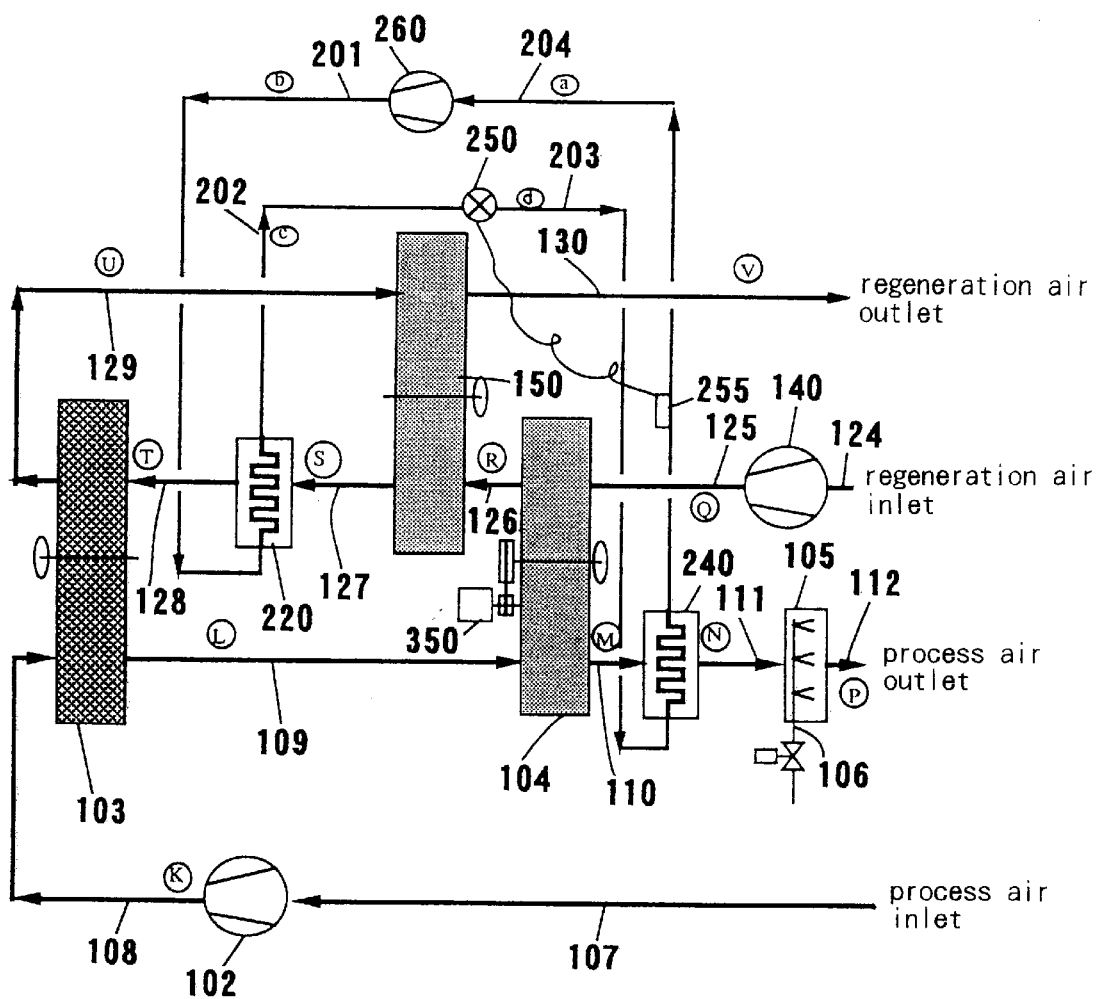
FIG. 1 is a diagram of a first embodiment of the air conditioning system of this invention.

Preferred embodiments will be presented with reference to the drawings. FIG. 1 shows a diagram of the basic structure of a first embodiment of the air conditioning system of the present invention. A vapor compression type heat pump 200 comprises: a compressor 260; a low-temperature heat source heat exchanger (evaporator) 240; a high-temperature heat source heat exchanger (condenser) 220; and an expansion valve 250 so as to construct a vapor compression type refrigeration circuit. Thus, low-pressure refrigerant vapor and post-desiccant process air exchange heat in the low-temperature heat source heat exchanger (evaporator) 240, and high-pressure refrigerant vapor and pre-desiccant regeneration air exchange heat in the high-temperature heat source heat exchanger (condenser) 220.

Figure 11:
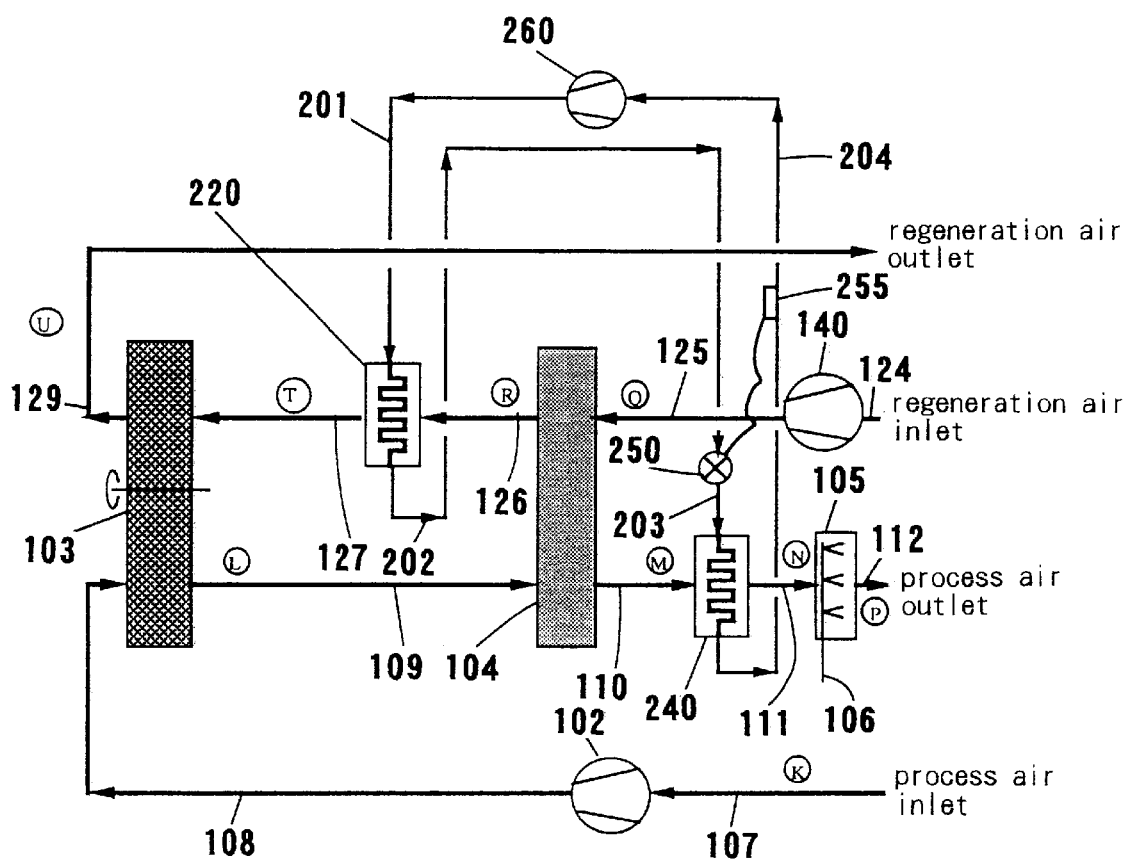
FIG. 11 is a diagram of the basic structure of another conventional desiccant-assisted air conditioning system.
Figure 12:
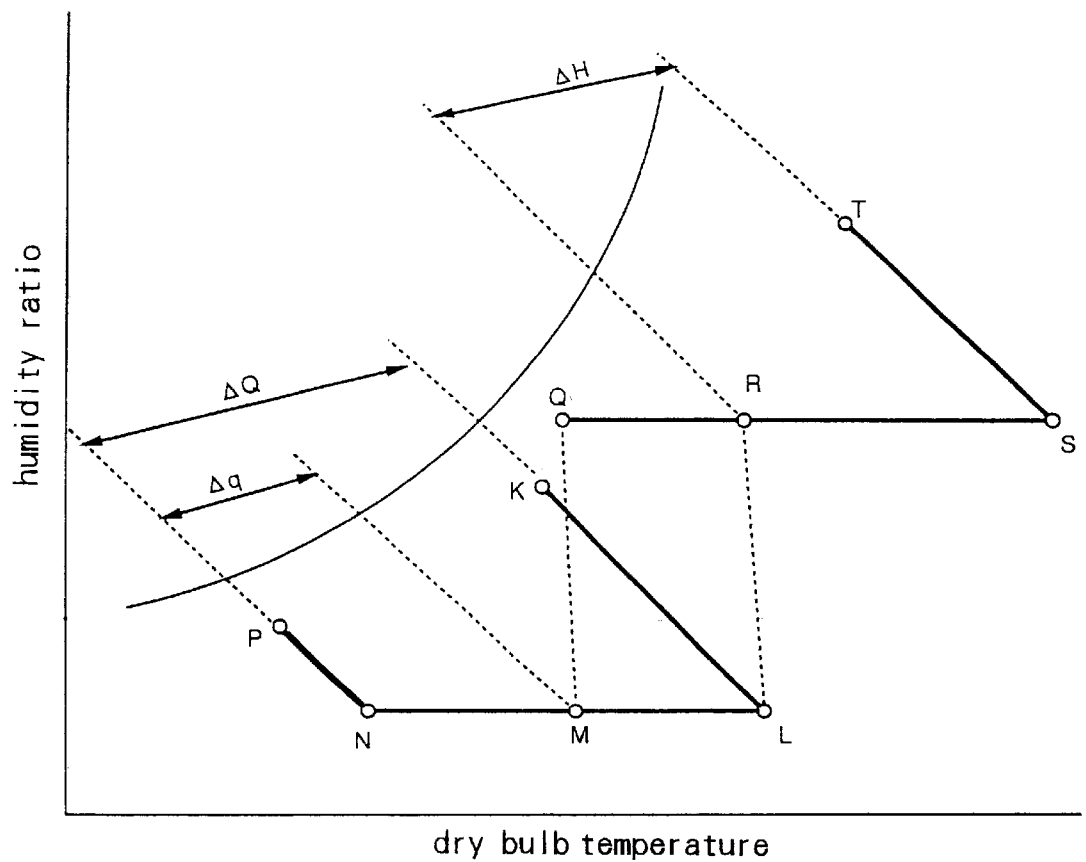
FIG. 12 is a psychrometric chart for the operation of the conventional desiccant-assisted air conditioning system shown in FIG. 11.

The circuit for flowing air is constructed as follows. Desiccant wheel 103 rotates at a given rotational speed while straddling both the process air passage A and the regeneration air passage B, as explained in FIG. 11. In the process air passage A, the inlet of the blower 102 for return air is connected to the conditioning space through a passage 107, and the outlet of the blower 102 is connected to the first zone that perform moisture adsorption in the desiccant wheel 103 through a passage 108, and the outlet of the desiccant wheel 103 for the process air is connected to a first sensible heat exchanger 104 for heat exchange with regeneration air through a passage 109, and the outlet of the first sensible heat exchanger 104 for the process air is connected to the low-temperature heat source heat exchanger (evaporator) 240 through a passage 110, and the outlet of the low-temperature heat source heat exchanger (evaporator) 240 for process air is connected to a humidifier 105 through a passage 111, and the outlet of the humidifier 105 is connected 10 to an outlet for processed air or a room air supply opening through a passage 112. This sequence constitutes a process air circuit.

In the meantime, the regeneration air passage B is connected to the inlet of the blower 140 for admitting outside air for use as regeneration air through a passage 124, and the outlet of the blower 140 is connected to the first sensible heat exchanger 104 for exchanging heat with process air through a passage 125, and the outlet of the first sensible heat exchanger 104 for regeneration air is connected to the second sensible heat exchanger 150 for exchanging heat with downstream regeneration air through a passage 126, and the outlet of the second sensible heat exchanger 150 for regeneration air is connected to the high-temperature heat source heat exchanger (condenser) 220 through a passage 127, and the outlet of the high-temperature heat source heat exchanger (condenser) 220 for regeneration air is connected to the second zone of the desiccant wheel 103 for performing desiccant regeneration through a passage 128, and the outlet for the regeneration air in the second zone of the desiccant wheel 103 is connected to the second sensible heat exchanger 150 through a passage 129, and the outlet of the second sensible heat exchanger 150 for regeneration air is connected to outside air through a passage 130. This sequence constitutes a circuit for admitting regeneration air from outside and discharging spent air to outside.

Regeneration air exchanges heat with process air in the first sensible heat exchanger 104, but because the first sensible heat exchanger 104 is a rotary heat exchanger, the quantity of heat exchanged between the process air that has not yet entered the low-temperature heat source heat exchanger 240 of the heat pump 200 and regeneration air admitted from outside, can be controlled by increasing or decreasing the rotational speed of the first sensible heat exchanger 104. In other words, by increasing the rotational speed of the first sensible heat exchanger 104, the quantity of heat exchanged is increased, and conversely, by decreasing the rotational speed, the quantity of heat exchanged is decreased. Accordingly, compared to the system shown in FIG. 11, the feature of this embodiment is the capability to adjust the quantity of heat exchanged in the first sensible heat exchanger between the process air and the regeneration air. In the drawing, circled letters K~V of the alphabet refer to the states of the air corresponding to those in FIGS. 2~4.

The cyclic process in the vapor compression type refrigeration circuit of the desiccant-assisted air conditioning system constructed as above will be explained. The refrigerant evaporates in the low-temperature heat source heat exchanger (evaporator) 240 by receiving the latent heat of evaporation from the process air dehumidified in the desiccant 103 (state a: about 10° C. at 4.2 kg/cm$^2$), and passes through the passage 204 and is drawn into the compressor 260 to be compressed. Compressed refrigerant (state b: about 80° C. at 19.3 kg/cm$^2$) passes through the passage 201 and condenses in the high-temperature heat source heat exchanger (condenser) 220 by releasing sensible heat of the superheated vapor of the refrigerant and the latent heat of evaporation to pre-desiccant regeneration air (statec: about 65° C. at 19.3 kg/cm$^2$), and arrives at the expansion valve 250 where it expands and reduces its pressure (state d: about 10° C. at 4.2 kg/cm$^2$) and flows back to the low-temperature heat source heat exchanger (evaporator) 240 through the passage 203. Accordingly, the technology used for cooling process in this system is not very different from that is in the conventional desiccant-assisted air conditioning system, and differs only in the operational temperature and pressures.

Figure 2:
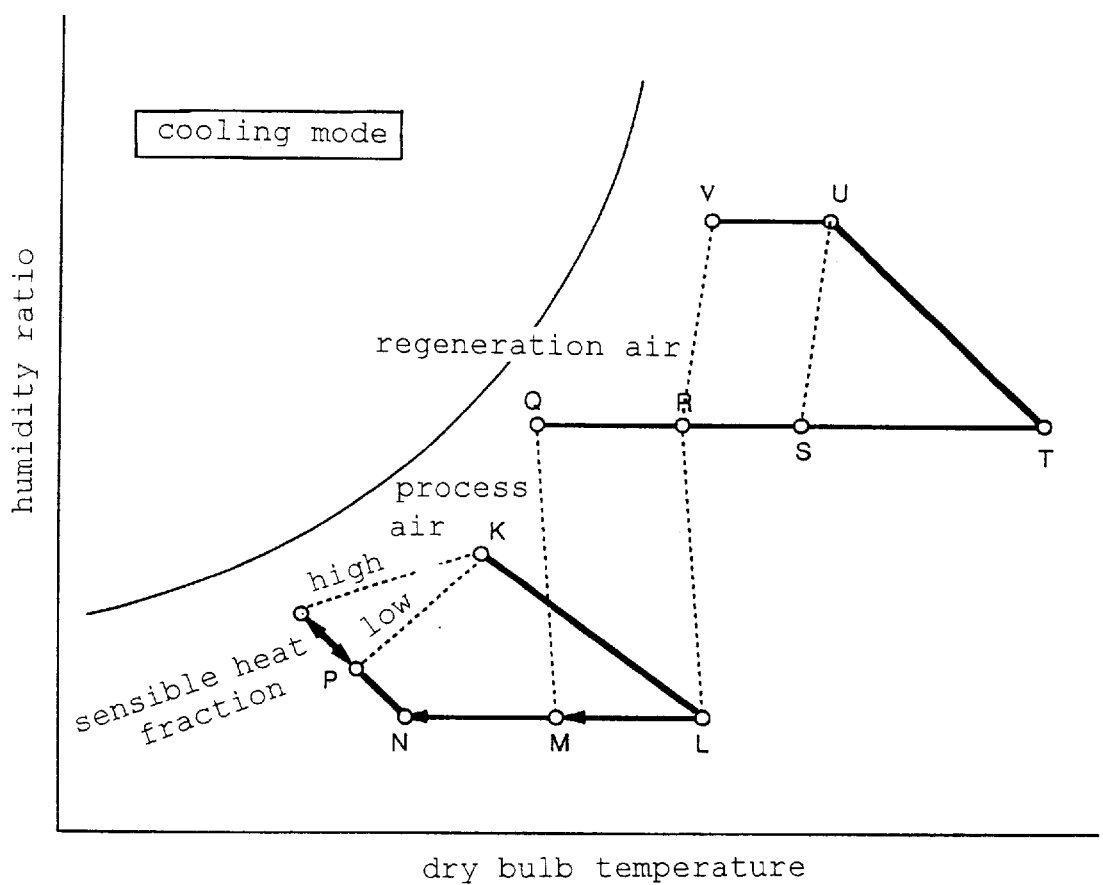
FIG. 2 is a psychrometric chart for the operation of the desiccant-assisted air conditioning system shown in FIG. 1.
Figure 3:
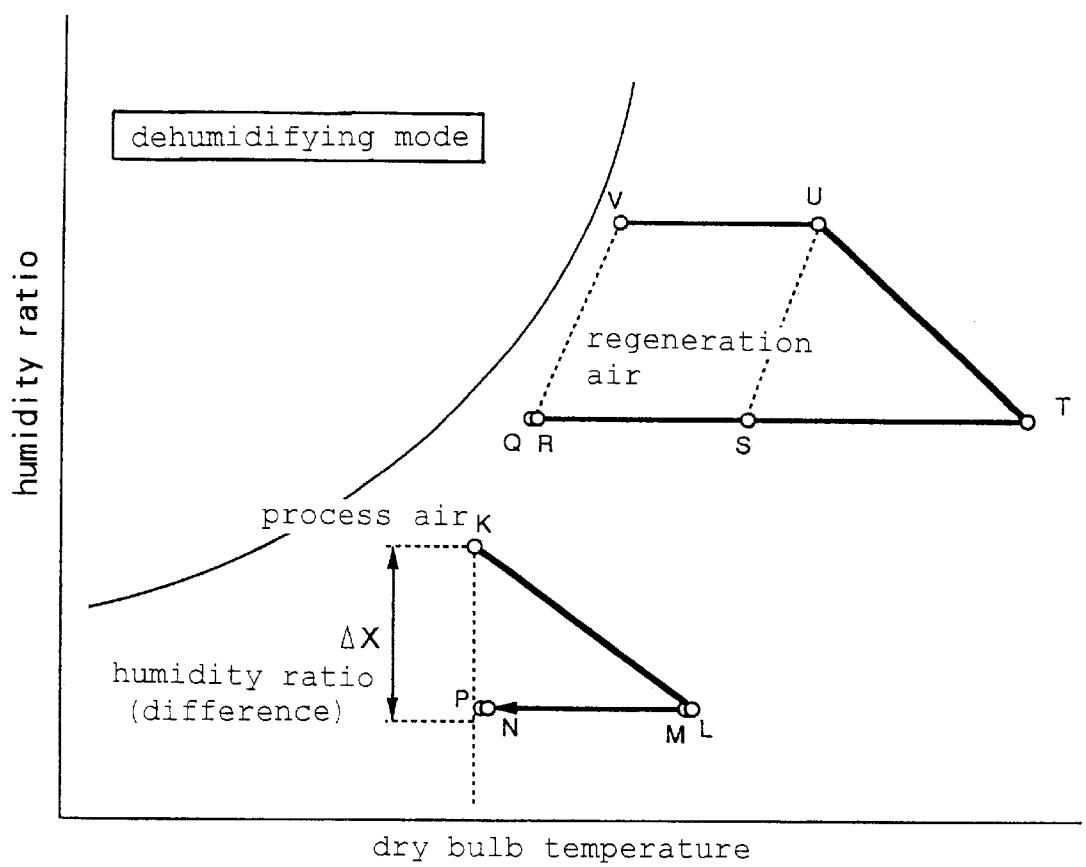
FIG. 3 is a psychrometric chart for the operation of the desiccant-assisted air conditioning system shown in FIG. 1.

Next, the operation of the system based on heat pump 200 as the heat source will be explained with reference to psychrometric charts shown in FIGS. 2 and 3. First, FIG. 2 relates to the cooling operation which is similar to that in the conventional system. This cooling operation is performed by rotating the first sensible heat exchanger 104 according to its rating so as to be operated to produce maximum cooling.

Return air (process air: state K) admitted to the system passes through the passage 107 and is drawn into the blower 102, and is pressurized and sent to the first zone, through the passage 108, to perform moisture adsorption in the desiccant wheel 103, and moisture in the process air is adsorbed in the moisture adsorbent in the desiccant wheel 103, and the process air lowers its humidity ratio and raises its temperature due to transfer of heat of adsorption (state L). Process air that has been lowered in humidity and increased in temperature is sent to the first sensible heat exchanger 104 through the passage 109, and exchanges heat with outside air (regeneration air) and is cooled (state M). Cooled process air passes through the passage 110 and is cooled while passing through the low-temperature heat source heat exchanger (evaporator) 240 (state N). Cooled process air is sent to the humidifier 105 and is cooled by water spraying or evaporative humidification in an isenthalpic process (state P), and is returned through the passage 112 as supply air to the conditioning space. Here, the system can be applied to various sensible heat fraction of the conditioning load, as shown in FIG. 2, by adjusting the rate of humidification.

On the other hand, regeneration of the desiccant wheel is carried out as follows. Outside air (state Q), used as regeneration air, passes through the passage 124, and is drawn into the blower 140, and is pressurized and sent to the first sensible heat exchanger 104, where it cools the process air while raising own temperature (state R), and reaches the second sensible heat exchanger 150 through the passage 126 to be heated (state S) by exchanging heat with downstream regeneration air which has regenerated the desiccant (state U), and is sent to the high-temperature heat source heat exchanger (condenser) 220, where it is heated by exchanging heat with the refrigerant vapor to raise its temperature (state T). Regeneration air exiting from the high-temperature heat source heat exchanger (condenser) 220 passes through the second zone of desiccant wheel 103 for performing regeneration, and desorbs moisture from the desiccant wheel 103 (state U), and is sent to the second sensible heat exchanger 150 through the passage 129, and is cooled (state V) by exchanging heat with the regeneration air at state R above mentioned, and is discarded outside as spent air through the passage 130. Accordingly, the desiccant-assisted air conditioning system operates cooling by repeating the processes of desiccant regeneration and dehumidifying and cooling of the process air.

Next, the so-called dehumidification mode of operation of the system suitable when the conditioning room indicates a low dry bulb temperature and a high humidity, as would be experienced during the Bai-u season, will be explained with reference to FIG. 3. Dehumidification operation in this embodiment is based on operating the first sensible heat exchanger 104 at a low speed so as to restrict heat exchange, but FIG. 3 shows the case with particularly low sensible heat fractions so that the operation is aimed primarily at dehumidifying, therefore, the first sensible heat exchanger 104 is not rotated and the quantity of heat exchanged is zero.

Return air (process air: state K) admitted to the system passes through the passage 107 and is drawn into the blower 102, and is pressurized and sent to the first zone, through the passage 108, to perform moisture adsorption in the desiccant wheel 103, where the moisture in the process air is adsorbed in the adsorbent in the desiccant wheel 103, and the process air lowers its humidity ratio and raises its temperature due to transfer of heat of adsorption (state L). Process air that has been lowered in humidity and increased in temperature is sent to the first sensible heat exchanger 104 through the passage 109, but because the first sensible heat exchanger 104 is not operating, there is no change in the state of process air and it passes therethrough (state M=L), and flows through the passage 110, and is cooled in the low-temperature heat source heat exchanger (evaporator) 240 (state N). Cooled process air is sent to the humidifier 105, but because there is no need for humidification in the dehumidification operation, it passes therethrough and is returned to the conditioning space as supply air through the passage 112. The system is operated so that the supply air (state P) is at a higher temperature than the return air (state K) so as to maintain a certain degree of humidity ratio difference $\Delta X$. On the other hand, regeneration of the desiccant rotor is carried out as follows. Outside air (state Q), used as regeneration air, passes through the passage 124, and is drawn into the blower 140, and is pressurized and sent to the first sensible heat exchanger 104, but because it is not operating, regeneration air passes therethrough without changing its state (state R=Q), and passes through the passage 126, and flows into the second sensible heat exchanger 150, and is heated to raise its temperature (state S) by the post-desiccant regeneration air (state U), and passes through the passage 127 to enter the high-temperature heat source heat exchanger (condenser) 220, where it is heated by the refrigerant vapor and raises its temperature (state T). Regeneration air exiting the high-temperature heat source heat exchanger (condenser) 220 passes through the second zone for regenerating the desiccant wheel 103 by desorbing the moisture therefrom (state U), and passes through the passage 129 to enter the second sensible heat exchanger 150, and is cooled (state V) by exchanging heat with regeneration air at state R, and is discarded outside as spent air through the passage 130.

Figure 4:
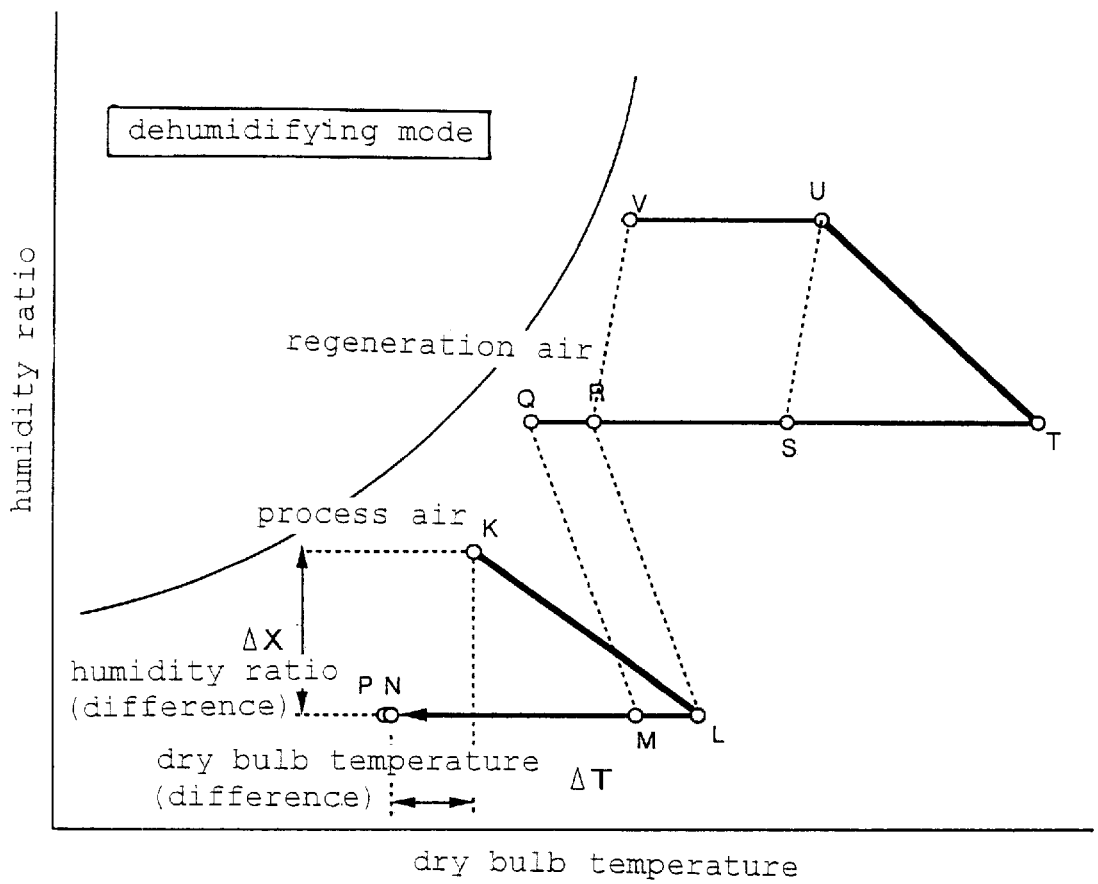
FIG. 4 is a psychrometric chart for the operation of the desiccant-assisted air conditioning system shown in FIG. 1.

Accordingly, by operating the system in such a way to admit the process air (state L) that has been raised in temperature by receiving the heat of adsorption of desiccant 103 to the low-temperature heat source heat exchanger (evaporator) 240 without cooling, the heat necessary for regenerating the desiccant is recovered in the low-temperature heat source heat exchanger (evaporator) 240, thereby enabling to maintain a humidity ratio difference $\Delta X$ while keeping the temperature of process air near room temperature, so that the process air can be dehumidified without causing excessive cooling in the conditioning space. On the other hand, even under the same dehumidifying operation, when the dry bulb temperature is close to the desired temperature setting and it is desirable to lower the supply air temperature somewhat (when it is so-called muggy), then, the first sensible heat exchanger should be rotated at a suitable intermediate speed so as to provide a moderate heat transfer, to cool the process air somewhat before the process air flows into the low-temperature heat source heat exchanger (evaporator) 240. Thus, as shown in FIG. 4, the dry bulb temperature of the process air (state N) which has been cooled in the low-temperature heat source heat exchanger (evaporator) 240 can be lowered because the dry bulb temperature of the process air at the exit (state M) of the first sensible heat exchanger 104 is moved somewhat to the left direction or low temperature side.

Therefore, this dehumidifying mode is operated by detecting the dry bulb temperature and humidity in the conditioning space, and when it is indicated that the conditioning space is at a lower temperature than the temperature setting and the humidity is higher than the humidity setting, the rotational speed of the first sensible heat exchanger 104 is decreased when the absolute value of the difference between the setting and the dry bulb temperature is large, while the speed is increased when the absolute value of the difference between the setting and the dry bulb temperature is small.

Accordingly, by providing the first sensible heat exchanger 104, which performs heat transfer between the post-desiccant process air that has not yet entered into the low-temperature heat source heat exchanger 240 of the heat pump 200 and pre-desiccant regeneration air, as a rotary heat exchanger in this embodied system, and by controlling the rotational speed of the first sensible heat exchanger 104 so as to selectively perform heat transfer process in the first sensible heat exchanger 104, it is possible to perform either cooling or dehumidifying operation. Also, it becomes possible to process small sensible heat loads even in the dehumidifying mode of operation by selecting the rotational speed of the first sensible heat exchanger 104 in a mid-range so as to adjust the heat transfer rate in the first sensible heat exchanger 104 thereby to adjust the supply air temperature.

Further, although this embodiment illustrated a rotary heat exchanger as the first sensible heat exchanger 104, but this can be replaced with a heat exchanger based on an intermediate thermal medium (for example warm water), disposed in the same location as the first sensible heat exchanger 104, and controlling the flow rate of the thermal medium for transfer of heat between regeneration air and process air, to obtain the same results.

Figure 5:
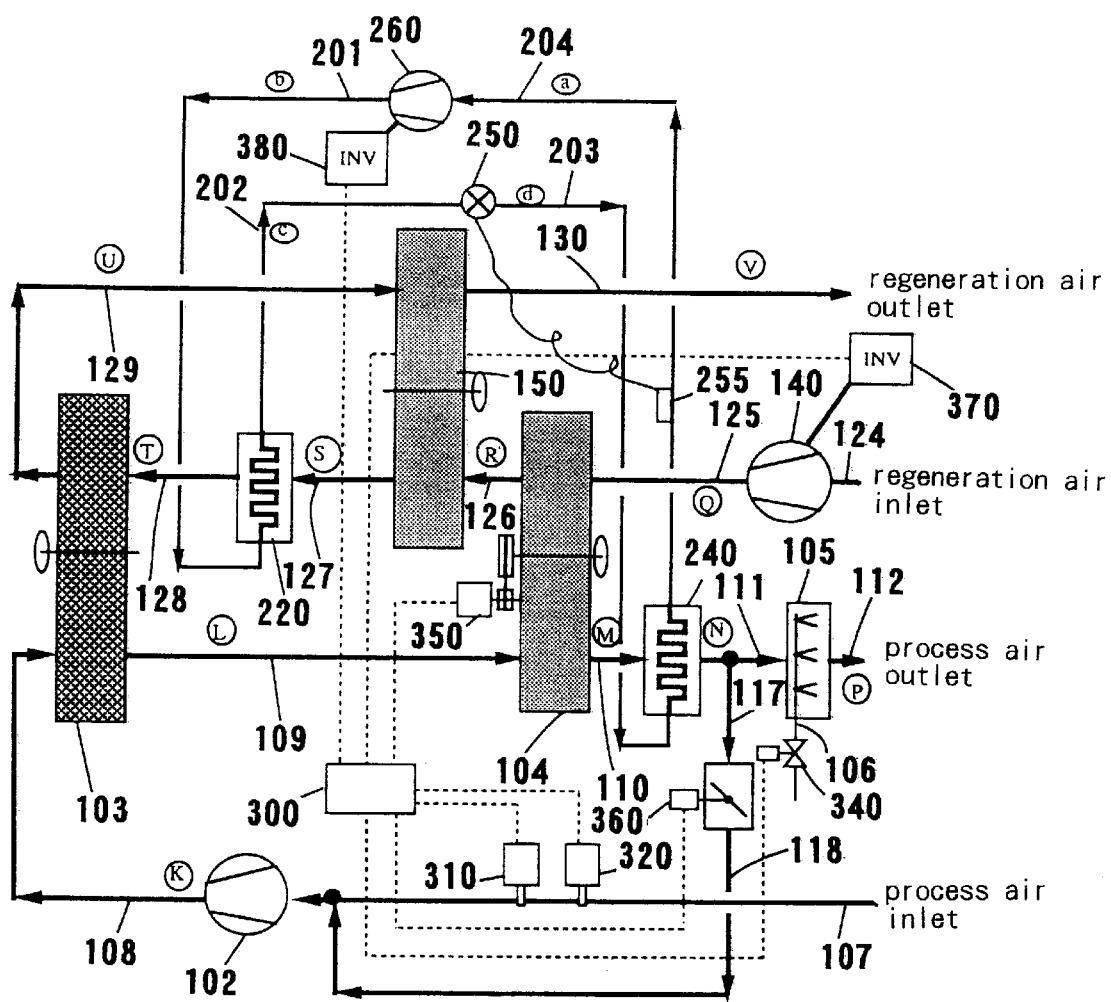
FIG. 5 is a diagram of a second embodiment of the air conditioning system of this invention.

FIG. 5 shows a second embodiment of this invention. In this embodiment, the vapor compression type heat pump is the same as in the first embodiment and its explanation is omitted. In the air flow passages, the regeneration air passage is the same as that shown in FIG. 1, and the process air passage is additionally provided with a bypass passage, which branches from a passage 111, which joins the outlet of the low-temperature heat source heat exchanger 240 and the humidifier 105, and merges with the passage 107, which joins the blower 102 in the process air passage and the conditioning space, by way of a passage 117, adjusting damper 360 and a passage 118.

Also, in this embodiment, the system is arranged so that a controller 300 can receive signals from a dry bulb temperature sensor 310 and a humidity sensor 320, installed in the return air inlet 107 for air returning from the conditioning space, and the controller 300 can adjust the rotational speed by controlling the rotation drive device 350 for the first sensible heat exchanger 104, and the controller 300 can adjust the degree of opening of the adjusting damper 360 in the bypass passage, and the controller 300 can adjust the degree of opening of the supply water valve 340 of the humidifier 105, and the controller 300 can adjust the rotational speed by controlling the inverter 380 of the refrigerant compressor 260, and further, the controller 300 can adjust the rotational speed by controlling the inverter 370 of the blower 140 for circulating regeneration air.

Figure 6:
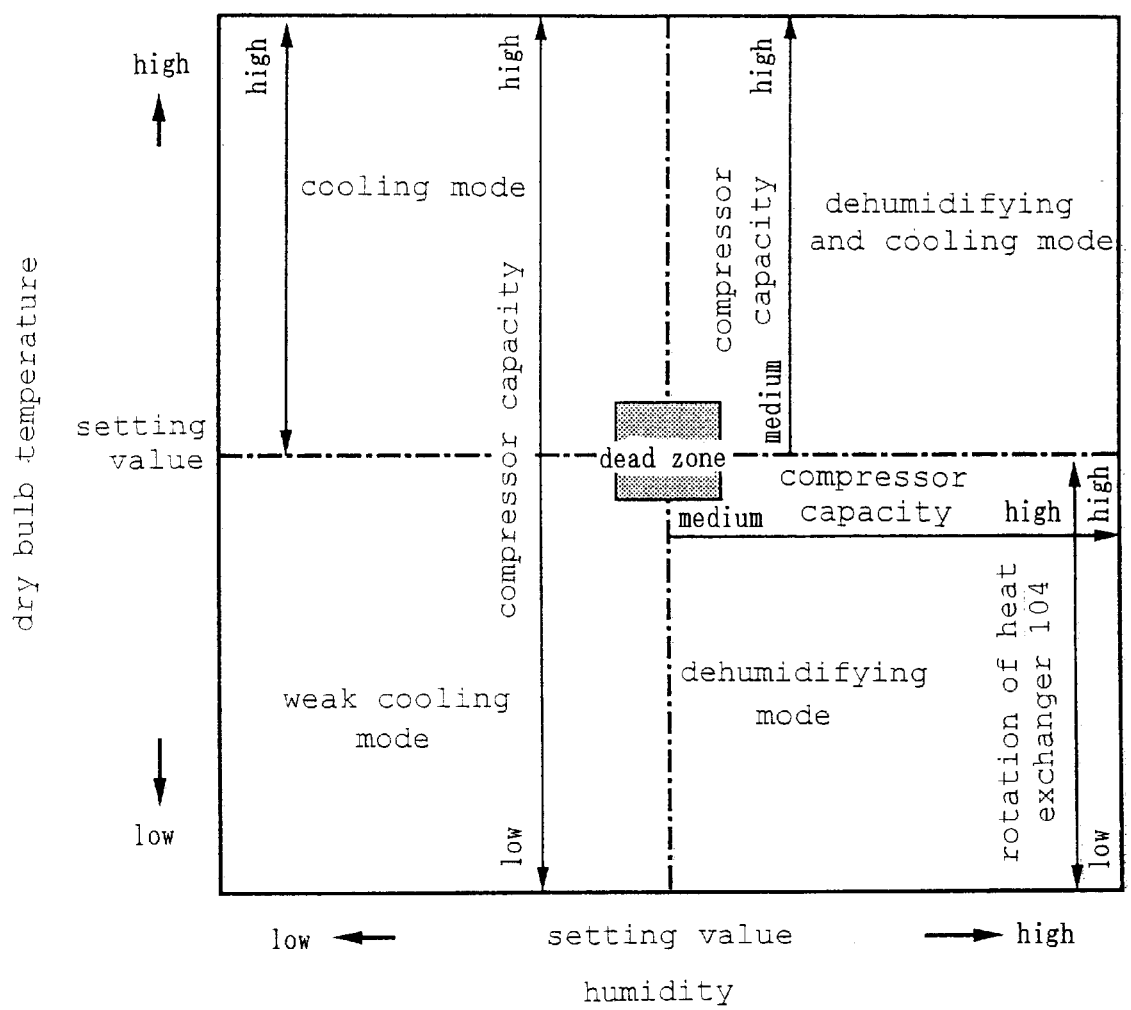
FIG. 6 is a diagram to explain the operational modes of the embodiment shown in FIG. 5.

As shown in the diagram in FIG. 6 for explaining the operational modes, the system detects the dry bulb temperature and humidity in the conditioning space, and undertakes a first operational mode (a dehumidifying and cooling mode) when the dry bulb temperature is higher than the temperature setting and the humidity is higher than the humidity setting, by operating the first sensible heat exchanger 104 at its rating speed, stopping the humidifier 105, operating the compressor 260 at higher capacity as the absolute value of the difference between the dry bulb temperature and the temperature setting increases, closing the bypass damper 360, and adjusting the flow rates of regeneration air in proportion to the capacity (rotational speed) of the compressor 260. The second operational mode (a cooling mode) is performed when the dry bulb temperature is higher than the temperature setting and the humidity is lower than the humidity setting, by operating the first sensible heat exchanger 104 at its rating speed, operating the humidifier 105 so as to increase the humidity for higher absolute values of the difference between the dry bulb temperature and the temperature setting, operating the compressor 260 at a higher capacity for higher absolute values of the difference between the dry bulb temperatures and the temperature setting, closing the bypass damper 360, and adjusting the flow rates of regeneration air in proportion to the capacity (rotational speed) of the compressor 260.

A third operational mode (weak cooling mode) is used when he dry bulb temperature is lower than the temperature setting and the humidity is lower than the humidity setting, by operating the first sensible heat exchanger 104 at its rating speed, stopping the humidifier 105, operating the compressor 260 at a lower capacity for higher absolute values of the difference between the dry bulb temperatures and the temperature setting, operating the bypass damper 360 at a higher opening for higher values of the absolute difference between the dry bulb temperature and the setting, and adjusting the flow rates of regeneration air in proportion to the capacity (rotational speed) of the compressor 260. Further, the fourth operational mode (dehumidification mode) is used when the dry bulb temperature is lower than the temperature setting and the humidity is higher than the humidity setting, by operating the first sensible heat exchanger 104 at a lower speed for higher values of the absolute values of the difference between the dry bulb temperature and the temperature setting, stopping the humidifier 105, operating the compressor 260 at a higher capacity for higher absolute values of the difference between the dry bulb temperatures and the temperature setting, closing the bypass damper 360, and adjusting the flow rates of regeneration air in proportion to the capacity (rotational speed) of the compressor 260.

Further, as shown in the table below, the fifth operational mode (desiccant regeneration mode) is used at the startup of the system when the desiccant is loaded with moisture and its desorbing capability has been degraded, by operating the first sensible heat exchanger 104 at its rating speed, stopping the humidifier 105, operating the compressor 260 at a higher capacity for higher absolute values of the difference between the dry bulb temperatures and the temperature setting, opening the bypass damper 360 fully, and adjusting the flow rates of regeneration air in proportion to the capacity (rotational speed) of the compressor 260.

TABLE

Various operational modes and settings

| Mode | Dehumidi/ Cool | Cool | Weak Cool | Dehumidi | Desic Regen |
|---|---|---|---|---|---|
| compress setting | by dry bulb temp | by dry bulb temp | by dry bulb temp | by humidity | by dry bulb temp |
| bypass damper 360 | closed | Closed | by dry bulb temp | closed | open |
| regen air flow rate | compress Rating rotation | compress Rating rotation | compress rating rotation | compress by dry bulb temp | compress rating rotation |
| heat exch 104 | | | | | |
| humidi valve 340 | Closed | by dry bulb temp | closed | closed | closed |
| dry bulb temp signal | High | High | low | low | not used |
| humidi sensor signal | High | Low | low | high | not used |

It is desirable that the humidity indicated here should be humidity ratio, but humidity sensor 320 may be a relative humidity sensor and the humidity ratio may be computed in conjunction with signals from the dry bulb temperature sensor 310, and similarly, sensor may be an enthalpy sensor and the humidity ratio may be computed in conjunction with the dry bulb temperature sensor 310, and humidity sensor 320 maybe a dewpoint sensor which yields results equivalent to the humidity ratio.

Figure 7:
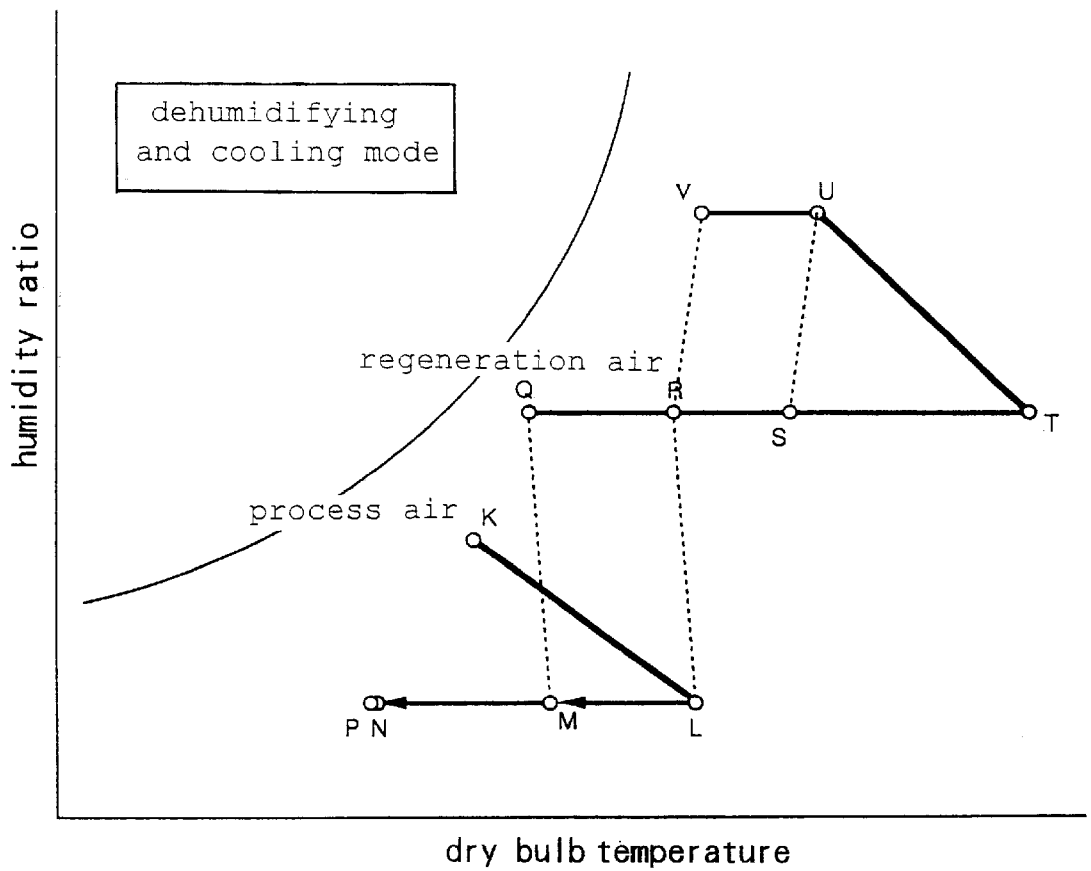
FIG. 7 is a psychrometric chart for the operation of the desiccant-assisted air conditioning system shown in FIG. 5.

The operation of the various operational modes will be explained in succession in the following. The first operational mode, dehumidifying and cooling, will be explained with reference to FIG. 7 showing an air cycle in this operational mode. Compared with the process of cooling shown in FIG. 2, because the humidifier is not operating, the state of air (state P) at the outlet of the process air in the process shown in FIG. 7 is the same as that at the outlet of the low-temperature heat source heat exchanger (state N), therefore, the humidity ratio of supply air is lower than that in the operation shown in FIG. 102, and the dry bulb temperature is higher, however, the supply air has lower dry bulb temperature and humidity than those in the conditioning space, so that the conditions in the conditioning space can be moved gradually towards the setting shown in lower left in FIG. 6. Also, in this mode of operation, the capacity of the compressor 260 is increased for the higher the dry bulb temperatures so that the differential temperature between the supply air and settings (indicated as dead zone in the figure) will increase, and the capacity of the system to cool and dehumidify the conditioning space to the settings is increased.

Next, the operation of the second operational mode will be explained. The process in this operational mode is the same as that in the cooling mode shown in FIG. 2, and the system is able to process cooling loads of a variety of sensible heat fractions. In other words, the supply air has a lower dry bulb temperature than that in the conditioning space, the conditions in the conditioning space can be moved gradually towards the settings in the right of FIG. 6. Also, in this mode of operation, the capacity of the compressor 260 is increased for the higher the dry bulb temperatures so that the differential temperature and humidity between the supply air and settings (indicated as dead zone in the figure) increases, and increases the capacity of the system to cool and dehumidify the conditioning space to the settings.

Figure 8:
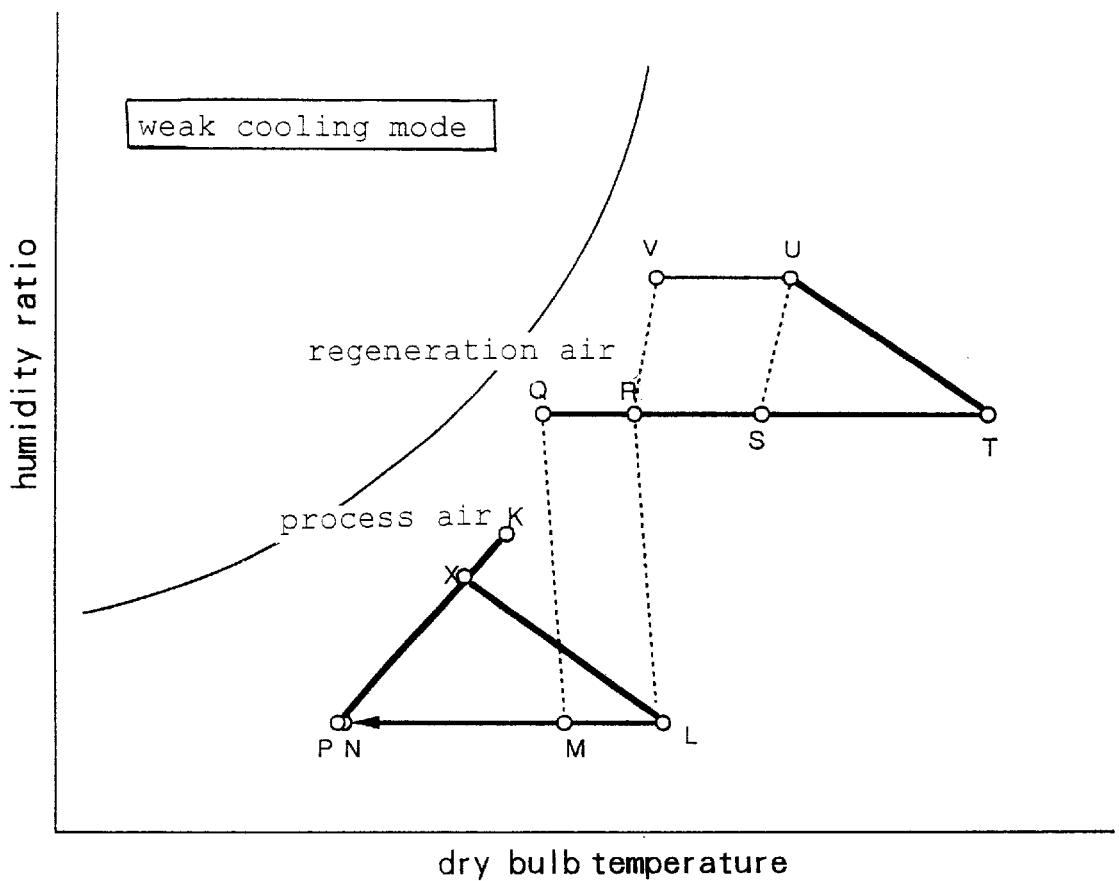
FIG. 8 is a psychrometric chart for the operation of the desiccant-assisted air conditioning system shown in FIG. 5.

Next, the operation of the third operational mode will be explained with reference to FIG. 8 showing an air process cycle in this operational mode. As shown in FIG. 8, return air (state K) is mixed with air in state N flowing in the bypass passage to become mixed process air (state X) and is dehumidified by adsorption in the desiccant. Therefore, process air at the inlet of the desiccant has low humidity and the load on the desiccant is reduced, and because the flow rates of supply air (state P) is reduced, the ability to dehumidify and cool can be reduced. Also, because the capacity of the compressor 260 is reduced for low values of dry bulb temperature in this operational mode, the ability of the system to cool and dehumidify the supply air is reduced, resulting in humidifying and heating the conditioning space while the conditioning load is superior. In this mode of operation, the conditions in the conditioning space can be moved gradually to the settings in the upper right in FIG. 6 by reducing the dehumidification and cooling ability than the conditioning load in the conditioning space.

Next, the fourth operational mode, dehumidifying, will be explained. The air process cycle in this embodiment is the same as that in the dehumidifying mode shown in FIGS. 3 and 4, and is controlled by adjusting the rotational speed of the first sensible heat exchanger 104 thereby adjusting the quantity heat transferred in the first sensible heat exchanger 104, and enabling to adjust the supply air temperature even in the dehumidifying mode to be able to process a small sensible heat load. Therefore, even if the latent heat load and sensible heat load are both present in the conditioning space, supply air can be processed to obtain a lower humidity than the conditioning space and comfortable temperature so that the conditions in the conditioning space can be moved gradually towards the settings in the upper left in FIG. 6. Also, in this operational mode, the capacity of the compressor 260 is increased for higher humidity so that the differential temperature between the supply air and settings (indicated as dead zone in the figure) increases, and the ability of the system to dehumidify the conditioning space to the setting is increased.

In the four operational modes presented above, the flow rates of regeneration air are adjusted in proportion to the rotational speed of the compressor 260, and this is because when the capacity of the compressor 260 is decreased, heating of regeneration air is also decreased, and therefore, if the compressor is operated at a constant speed, it is not possible to heat regeneration air to a temperature required for desorbing the moisture from the desiccant, and for this reason, when the capacity of the compressor 260 is decreased heating becomes inadequate so that, in order to compensate it, the flow rate of regeneration air is decreased to maintain the regeneration temperature. It follows that instead of adjusting the rotational speed of the compressor 260, outlet temperature of regeneration air or the outlet temperature of the refrigerant in the high-temperature heat source heat exchanger (condenser) 220 may be detected in the passage 128 or 202 so that the speed of the blower 124 may be adjusted to keep the temperatures constant in those locations.

Figure 9:
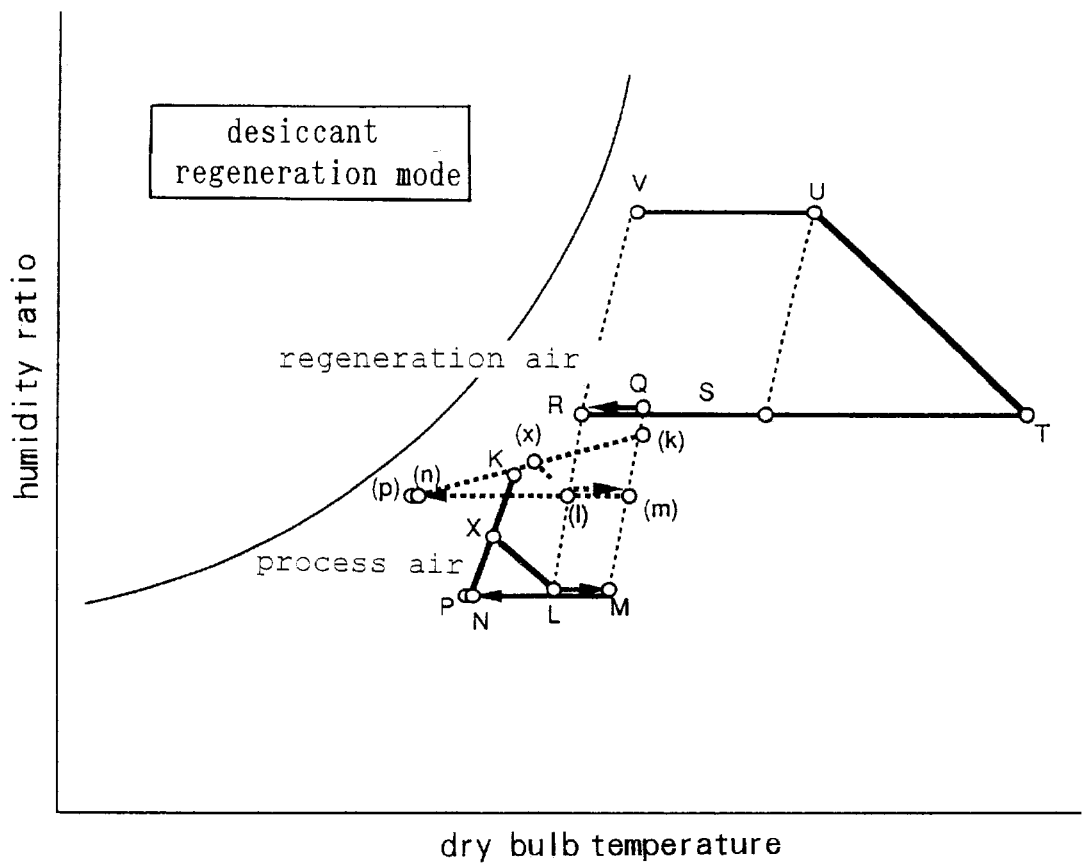
FIG. 9 is a psychrometric chart for the operation of the desiccant-assisted air conditioning system shown in FIG. 5.
Figure 10:
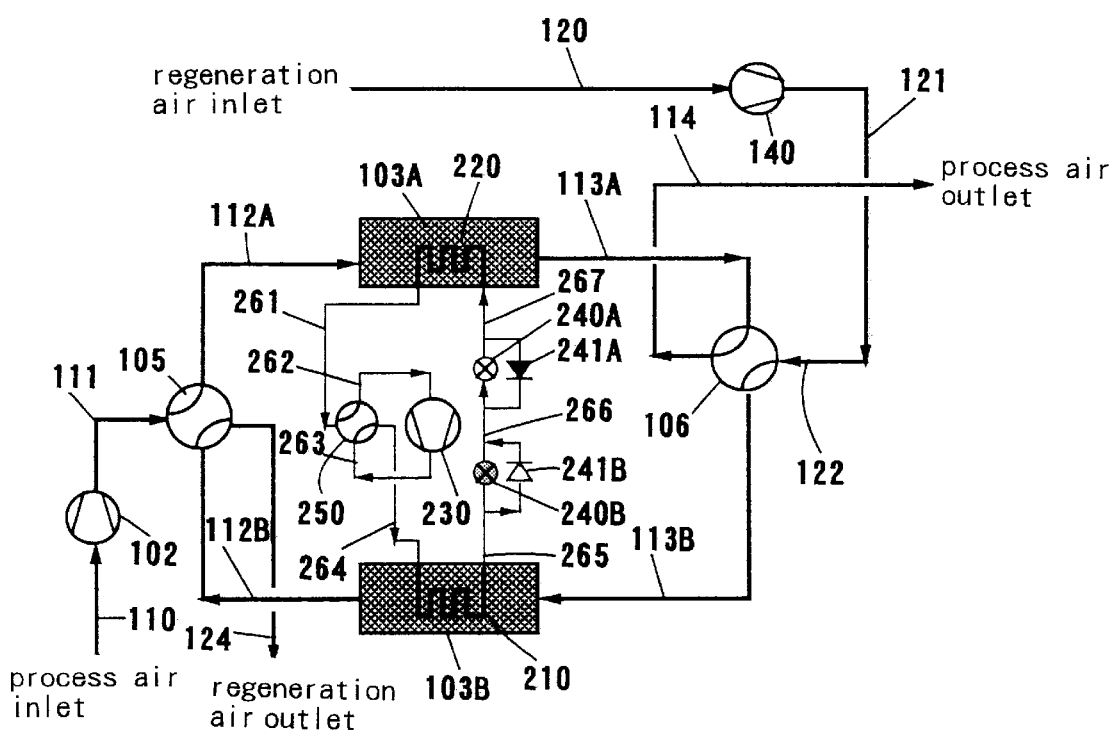
FIG. 10 is a diagram of the basic structure of a conventional desiccant-assisted air conditioning system.

Next, the fifth operational mode which is the desiccant regeneration mode will be explained. The air process cycle of this operational mode is shown in FIG. 9. As shown in FIG. 9 by solid lines, return air (state K.) from the conditioning space (not shown) is mixed with the air in state N flowing in the bypass passage to become mixed process air (state X) and is dehumidified by adsorption in the desiccant (state L), and raises its temperature (state M) by exchanging heat with regeneration air admitted from the outside (state Q) in the first sensible heat exchanger 104, and is cooled in the low-temperature heat source heat exchanger 240 (state N) in the heat pump 200, and a portion bypasses and mixes with return air (state K), and again circulates through the same path, while the remaining portion passes through the humidifier 105 with no change and is discarded as spent air (state P). On the other hand, regeneration air admitted from outside (state Q) lowers its temperature (state R) by exchanging heat with post-desiccant process air (state L) in the first sensible heat exchanger 104, but raises its temperature (state T) by exchanging heat with downstream post-desiccant regeneration air (state U) in the second sensible heat exchanger 150, and passes through passage 127, is sent to the second high-temperature heat source heat exchanger (condenser) 220 and is heated (state T) by the vapor of the refrigerant, and regenerates the desiccant 103 by adsorbing the moisture while passing therethrough. Post-desiccant regeneration air (state U) exchanges heat with regeneration air in state R in the second sensible heat exchanger 150, and lowers its temperature (state V), and is then discarded to outside as spent air.

Accordingly, when the adsorption performance of the desiccant is inadequate due to non-use over a long term, this operational mode enables to circulate process air internally so as to suppress adsorption of moisture in the desiccant, and the heat recovered in the low temperature source of the heat pump 200 is transferred from the regeneration air to the process air in the first sensible heat exchanger 104 so as to increase the heating capability of the heat pump 200, thereby recuperating the desorption capability of the desiccant.

In the embodiment shown by solid lines in FIG. 9, it is supposed that the return air (state K) from the conditioning space has lower temperature and lower humidity than the outside air (state Q), but if the compressor 260 is operated at full speed, supply air (state P) entering the conditioning space becomes low temperature and low humidity, and if the conditioning load is low, the room may become too cold. In such a case, because the conditioning load is low, the speed of the compressor 260 can be lowered according to signals from the dry bulb temperature sensor so that the capacity of the heat pump 200 can be lowered, and regeneration speed is lowered and regeneration time may be extended without causing any problem in practice. In such a case, it is necessary to adjust the flow rate of regeneration air by using the inverter 370 to control the speed of the compressor proportionately, to maintain the regeneration temperature, as described in the first to the third operational modes.

Also, as shown by the dotted lines in FIG. 9, when the indoor temperature (state (k) ) is roughly the same as the outdoor temperature (state Qg), the state of the pre-desiccant process air (state (x)) is roughly the same as state of the post-desiccant process air (state (l) so that there is no transfer of the heat of adsorption, so that the temperature of the process air becomes lower than the outside air (state Q), and after raising the temperature (state (m)) by exchanging heat in the first sensible heat exchanger 104, it is cooled in the low-temperature heat source heat exchanger 240 to become supply air (state (p)). In this case, there is a high cooling load in the conditioning space, and the compressor speed should be raised to lower the supply air temperature (state P), resulting in increasing the quantity of heat available for regeneration to quickly recuperate dehumidifying capability of the desiccant so that supply air (state (p)) is gradually dehumidified so as to be able to process sensible heat load. Thus, in the fifth operational mode, or the desiccant regeneration mode, desiccant regeneration is performed smoothly by controlling the compressor speed in relation to the conditioning load based on the dry bulb temperature.

Accordingly, this embodiment is flexibly adaptable to process a variety of conditioning loads, i.e., [dehumidifying and cooling], [cooling], [weak cooling], [dehumidifying], [desiccant regeneration].

As explained above, this invention enables an air conditioning system to carry out the processes of moisture adsorption by a desiccant and regeneration of the desiccant by a heat pump continually, by adjusting the heat transfer process between the post-desiccant process air that has not yet flowed into the low temperature heat source heat exchanger and regeneration air that has not yet flowed into high temperature heat source heat exchanger, so that, when processing circulating air having a low sensible heat fraction, operation is aimed primarily at dehumidification so that the sensible heat exchanger is suppressed to conserve heat for use in the low-temperature heat source heat exchanger, so that an operation of maintaining a high outlet temperature of process air is possible, thereby providing an air conditioning system and method of operation to produce superior performance in dehumidification as well as flexible adaptability for processing a variety of conditioning loads and to result in energy saving. In addition, by providing for the process air a bypass passage branching from the outlet of the low-temperature heat source heat exchanger and return-ing upstream of the blower, at the startup of the system, if the desiccant is loaded with moisture, the process air is circulated internally so as to regenerate the desiccant while suppressing further adsorption of moisture on the desiccant, thereby providing a system and a method of operating the system exhibiting excellent startup characteristics.

Industrial Applicability

This invention can be used as an air conditioning system for use in normal dwellings or in large buildings such as supermarkets and offices, for example.

What is claimed is:

1. An air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating said desiccant;

wherein processes of heat transfer in a sensible heat exchanger are made adjustable, for exchanging heat between post-desiccant process air that has not flowed into said low temperature heat source and pre-desiccant regeneration air that has not yet regenerated said desiccant.

2. An air conditioning system comprising: a desiccant for adsorbing moisture from process air; and a heat pump, including a compressor, that operates by using process air as a low-temperature heat source and regeneration air as a high-temperature heat source so as to supply heat to regeneration air for regenerating said desiccant;

wherein post-desiccant process air that has passed through said desiccant exchanges heat in a first sensible heat exchanger with regeneration air that has not yet flowed into a high-temperature heat source heat exchanger of said heat pump; and regeneration air that passed through said first sensible heat exchanger but has not yet entered said high temperature heat source heat exchanger exchanges heat in a second sensible heat exchanger with post-desiccant regeneration air; and heat transfer processes in said first sensible heat exchanger are made adjustable.

3. An air conditioning system according to claim 2, wherein at least said first sensible heat exchanger is a rotary heat exchanger, whose heat exchange processes are made adjustable by varying a rotational speed.

4. An air conditioning system comprising: a desiccant for adsorbing moisture in process air; and a heat pump, including a compressor, that operates by using process air as a low-temperature heat source and regeneration air as a high-temperature heat source so as to supply heat to regeneration air for desiccant regeneration;

wherein paths of process air and regeneration air that pass through said desiccant are divided into a first zone for dehumidifying process air and a second zone for regenerating said desiccant using regeneration air so that said desiccant repeatedly shifts its position between said first zone and said second zone, and said heat pump is comprised by at least a compressor, a low-temperature heat source heat exchanger and a high-temperature heat source heat exchanger, and said path of process air is routed sequentially from an inlet for said process air, through said desiccant in said first zone, a first sensible heat exchanger, and said low-temperature heat source heat exchanger to arrive at an outlet for process air, and said path of regeneration air is routed sequentially from an inlet for said regeneration air, through said first sensible heat exchanger, a second sensible heat exchanger, said high temperature heat source heat exchanger, said desiccant in said second zone, and said second sensible heat exchanger to arrive at an outlet for regeneration air, and process air exchanges heat with regeneration air in said first sensible heat exchanger, regeneration air exchanges heat with regeneration air in said second sensible heat exchanger, and heat transfer processes in said first sensible heat exchanger are made adjustable.

5. An air conditioning system according to claim 4, wherein said desiccant is shaped in a wheel, and said desiccant repeatedly shifts its position between said first zone and said second zone through its rotation.

6. An air conditioning system according to claim 4 or 5, wherein at least said first sensible heat exchanger is a rotary heat exchanger so that heat transfer processes are made adjustable by varying a rotational speed of said first sensible heat exchanger.

7. A method for operating an air conditioning system according to claim 6, wherein measurements of dry bulb temperature and humidity in a conditioning space are obtained so that, when a dry bulb temperature measurement is lower than a temperature setting and a humidity measurement is higher than a humidity setting, a rotational speed of said first sensible heat exchanger is adjusted so that when an absolute value of a difference between said dry bulb temperature measurement and said temperature setting is high, said rotational speed is decreased, and when an absolute value of a difference between said dry bulb temperature measurement and said temperature setting is low, said rotational speed is increased.

8. An air conditioning system comprising: a desiccant for adsorbing moisture in process air; and a heat pump, including a compressor, that operates by using process air as a low-temperature heat source and regeneration air as a high-temperature heat source so as to supply heat to regeneration air for desiccant regeneration;
wherein paths of process air and regeneration air that pass through said desiccant are divided into a first zone for dehumidifying process air and a second zone for regenerating said desiccant using regeneration air so that said desiccant repeatedly shifts its position between said first zone and said second zone, and said heat pump is comprised by at least a compressor, a low-temperature heat source heat exchanger and a high-temperature heat source heat exchanger, and said path of process air is routed sequentially from an inlet for process air, through said desiccant in said first zone, a first sensible heat exchanger, said low temperature heat source heat exchanger, and a humidifier to arrive at an outlet for process air, and said path of regeneration air is routed sequentially from an inlet for regeneration air, said first sensible heat exchanger, said second sensible heat exchanger, said high temperature heat source heat exchanger, said desiccant in said second zone, and said second sensible heat exchanger to arrive at outlet for regeneration air, and process air exchanges heat with regeneration air in said first sensible heat exchanger, regeneration air exchanges heat with regeneration air in said second sensible heat exchanger, and heat transfer processes in said first sensible heat exchanger are made adjustable.

9. An air conditioning system according to claim 8, wherein said desiccant is shaped in a wheel, and said desiccant repeatedly shifts its position between said first zone and said second zone through its rotation.

10. An air conditioning system according to claim 8, wherein at least said first sensible heat exchanger is a rotary heat exchanger so that heat transfer processes are made adjustable by varying a rotational speed of said first sensible heat exchanger.

11. An air conditioning system according to any of claims 8 to 10, wherein a bypass passage is provided so as to bypass process air from a downstream location of said low-temperature heat source heat exchanger to an upstream location of said desiccant.

12. A method for operating an air conditioning system according to claim 8, comprising the steps of: detecting dry bulb temperature and humidity in a conditioning space to select an operational mode from four operational modes; wherein a first operational mode is chosen, when a dry bulb temperature measurement is higher than a temperature setting and a humidity measurement is higher than a humidity setting, by operating said first sensible heat exchanger at a maximum capacity, stopping said humidifier, and operating said compressor so as to increase a capacity as an absolute value of a difference between said dry bulb temperature measurement and said temperature setting measurement increases; and a second operational mode is chosen, when a dry bulb temperature measurement is higher than a temperature setting and a humidity measurement is lower than a humidity setting, by operating said first sensible heat exchanger at a maximum capacity, operating said humidifier, and operating said compressor so as to increase a capacity as an absolute value of a difference between said dry bulb temperature measurement and said temperature setting measurement increases; and a third operational mode is chosen, when a dry bulb temperature measurement is lower than a temperature setting and a humidity measurement is lower than a humidity setting, by operating said first sensible heat exchanger at a maximum capacity, stopping said humidifier, and operating said compressor so as to decrease a capacity as an absolute value of a difference between said dry bulb temperature measurement and said temperature setting measurement increases; and a fourth operational mode is chosen, when a dry bulb temperature measurement is lower than a temperature setting and a humidity measurement is higher than a humidity setting, operating said first sensible heat exchanger so as to decrease a heat exchange capacity as an absolute value of a difference between said dry bulb temperature measurement and said temperature setting measurement increases, stopping said humidifier, and operating said compressor so as to increase a capacity as an absolute value of a difference between said dry bulb temperature measurement and said temperature setting measurement increases.

13. A method according to claim 12, wherein a flow rate of regeneration air is decreased as a capacity of said compressor is decreased.

14. A method according one of claim 12 or 13, wherein, when said compressor is operated at a reduced capacity, a bypass flow rate of process air is increased by branching process air from a downstream location of said low-temperature heat source heat exchanger and routing to an upstream location of said desiccant.

15. A method according to claim 11, wherein said desiccant is regenerated by operating said first sensible heat exchanger at a maximum capacity, and branching process air from a downstream location of said low-temperature heat source heat exchanger and routing to an upstream location of said desiccant.

* * * * *